United States Patent [19]

Dunning

[11] Patent Number: 5,473,755
[45] Date of Patent: Dec. 5, 1995

[54] SYSTEM FOR CONTROLLING DATA STREAM BY CHANGING FALL THROUGH FIFO LAST CELL STATE OF FIRST COMPONENT WHENEVER DATA READ OUT OF SECOND COMPONENT LAST LATCH

[75] Inventor: Dave Dunning, Portland, Oreg.

[73] Assignee: Intel Corporation, Santa Clara, Calif.

[21] Appl. No.: 892,550

[22] Filed: Jun. 1, 1992

[51] Int. Cl.$^6$ .................................................. G06F 13/14
[52] U.S. Cl. .......................... 395/250; 395/286; 395/427; 364/239.6; 364/247.3; 364/247.8; 364/DIG. 1
[58] Field of Search .................................... 395/250, 200, 395/425, 286, 427; 364/239.6, 247.3, 247.8, 251.3, 284.1, 942.7

[56] References Cited

U.S. PATENT DOCUMENTS

| | | | |
|---|---|---|---|
| 3,921,145 | 11/1975 | Emm et al. | 395/725 |
| 4,447,704 | 5/1984 | Suzuki et al. | 347/211 |
| 4,562,486 | 12/1985 | Suzuki et al. | 358/464 |
| 4,573,140 | 2/1986 | Szeto | 395/425 |
| 4,630,295 | 12/1986 | Kamuro et al. | 377/81 |
| 4,642,797 | 2/1987 | Hoberman | 365/221 |
| 4,995,056 | 2/1991 | Fogg, Jr. et al. | 370/94.1 |
| 5,195,055 | 3/1993 | Miznoka et al. | 365/78 |
| 5,249,271 | 9/1993 | Hopkinson et al. | 395/250 |
| 5,276,808 | 1/1994 | Cheney et al. | 395/250 |
| 5,280,584 | 1/1994 | Caesar et al. | 395/250 |
| 5,295,246 | 3/1994 | Bischoff et al. | 395/250 |
| 5,317,692 | 5/1994 | Ashton et al. | 395/200 |

Primary Examiner—Thomas C. Lee
Assistant Examiner—Moustafa M. Meky
Attorney, Agent, or Firm—Blakely, Sokoloff, Taylor & Zafman

[57] ABSTRACT

A method and apparatus providing for high speed data transfers between a sending component and a receiving component is disclosed. In accordance with the present invention, in addition to handshake logic, the receiving component incorporates means for temporarily storing data words sent to the receiving component. The sending component incorporates, in addition to handshake logic, means for determining whether the aforementioned means for temporarily storing data is full, and therefore, unable to accept additional data. The sending component streams data words to the receiving component without the need for an acknowledge signal until it determines that the means for temporarily storing data is full. Asynchronous with this streaming of data words, whenever the receiving component reads a data word from the means for temporarily storing data, it sends an acknowledge signal to the sending component. This acknowledge signal is coupled to the sending component and thereby communicates to the means for determining whether the means for temporarily storing data is full that additional space for a data word is available.

22 Claims, 4 Drawing Sheets

SYSTEM FOR CONTROLLING DATA STREAM BY CHANGING FALL THROUGH FIFO LAST CELL STATE OF FIRST COMPONENT WHENEVER DATA READ OUT OF SECOND COMPONENT LAST LATCH

RELATED APPLICATION

This application is related to U.S. patent application Ser. No.: 07/892,535, filed Jun. 01, 1992, now U.S. Pat. No. 5,333,279, concurrently, entitled Self-timed Mesh Routing Chip with Data Broadcasting, assigned to the same assignee of Intel, Inc., Santa Clara, Calif.

BACKGROUND OF THE INVENTION

1. Field of the Invention

The present invention relates to the field of data transfers between electronic components, and more particularly, to a method and apparatus for high speed data streaming between electronic components.

2. Art Background

In most computer systems, data transfers between a sending component and a receiving component proceed according to a particular handshake routine or protocol. The handshake routine corresponds to an ordered sequence of events which necessarily takes place whenever data is sent from a sending component to a receiving component within the system. Such a handshake routine typically includes the transfer of certain control signals between the two components. For example, in one such handshake routine, a sending component transmits a control signal indicating the transmission of data, as well as a first piece of data, to the receiving component. When the receiving component receives this first piece of data, it returns an acknowledge signal to the sending component, thereby informing the sending component that it has received the data. In response to the acknowledge signal, the sending component then sends a second piece of data to the receiving component, and the above handshake routine is repeated, for example, until an entire packet of data is sent from the sending component to the receiving component.

It will be appreciated that data transfers taking place in accordance with the above handshake routine, as well as many others in the prior art, necessarily incorporate a certain amount of time delay corresponding to the amount of time it takes for an acknowledge signal to propagate from the receiving component to the sending component. This time delay becomes increasingly significant as the sending component and the receiving component are physically placed farther and farther apart. In addition, within the context of routing data from one processor node to another processor node in a two dimensional mesh of processor nodes, the propagation time associated with an acknowledge signal can be substantial. Of particular concern is the fact that as this propagation delay increases, it begins to impact the bandwidth at which data can be transferred between the two components.

As will be described, the method and apparatus of the present invention provide for high speed data transfers which are substantially unaffected by the aforementioned propagation delay.

SUMMARY OF THE INVENTION

The present invention finds application in data transfers between components in a data processing system. In particular, the apparatus and method of the present invention provides for high speed data transfers, termed "data streaming," between a sending component and a receiving component in a data processing system. In accordance with the present invention, in addition to handshake logic providing for the issuance of an acknowledge signal, the receiving component incorporates means for temporarily storing data sent to the receiving component. When the receiving component is able to utilize data, it reads the data from the means for temporarily storing data, and issues an acknowledge signal. In accordance with the present invention, the means for temporarily storing data comprises several stages of serially connected data FIFO's, with the receiving component ultimately reading data from the last stage of the serially connected data FIFO's.

In the present invention, the sending component incorporates, in addition to handshake logic, means for determining whether the aforementioned means for temporarily storing data is full, and therefore, unable to accept additional data. In particular, the means for determining utilizes information stored within the sending component indicative of how full the means for temporarily storing data is at any given time. In accordance with the present invention, the means for determining comprises a fall through FIFO counter having the same number of stages as the serially connected data FIFO's in the receiving component.

Under the method of the present invention, at start-up of the system, each stage of the fall through FIFO counter in the sending component is initially cleared to an empty state. Thereafter, each time data is sent from the sending component to the receiving component, a signal indicating a full state is coupled to the first stage of the fall through FIFO counter and rippled down to the empty stage of the counter closest to the last stage. Because the number of stages in the counter corresponds to the number of data FIFO stages in the receiving component, the sending component is able to determine that the data FIFO's in the receiving component are full whenever the first stage in the FIFO counter is full prior to a data transfer. Therefore, if prior to a desired data transfer, the first stage of the FIFO counter in the sending component is in an empty state, the sending component initiates a data transfer. On the other hand, if prior to a desired data transfer, the first stage of the FIFO counter is in a full state, the sending component does not transfer new data, but instead, waits until the first stage of the FIFO counter returns to an empty state.

Asynchronous with the above described process occurring in the sending component, within the receiving component, whenever data is read from the last stage of the serially connected data FIFO's, the receiving component issues an acknowledge signal. This acknowledge signal is then coupled to the last stage of the FIFO counter in the sending component, clearing the last stage of the FIFO counter to an empty state, thereby causing any full states in the preceding stages to ripple down the FIFO counter. Thus, the present invention provides for high speed data transfers substantially unaffected by the distance between the sending component and the receiving component.

BRIEF DESCRIPTION OF THE DRAWINGS

Further details are explained below with the help of the examples illustrated in the attached drawings in which.

DETAILED DESCRIPTION OF THE INVENTION

A high speed data transfer method and apparatus is described. In the following description, for purposes of explanation, numerous details are set forth such as specific bandwidths, bit values, data paths, data word size etc. in order to provide a thorough understanding of the present invention. However, it will be apparent to one skilled in the art that these specific details are not essential to the practice of the present invention. In other instances, in a number of figures well known electrical structures and circuits are shown in block diagram form in order not to obscure the present invention unnecessarily.

While the present invention will be described within a certain context, the method and apparatus of the present invention is in no way limited to this particular context, but instead, finds application in a wide variety of data processing systems. In particular, the present invention is advantageously utilized in conjunction with message routing chips arrayed in a two-dimensional mesh as described in the copending patent application entitled "Self-Timed Mesh Routing Chip With Data Braodcast," filed concurrently herewith, by the same named inventor. In the description which follows, the term "component" is intended to encompass a wide variety of data sending and receiving agents in the computer and electronic arts, including message routing chips, processors, coprocessors, input/output devices, peripherals, memories, network interfaces, etc.

Figure 1:
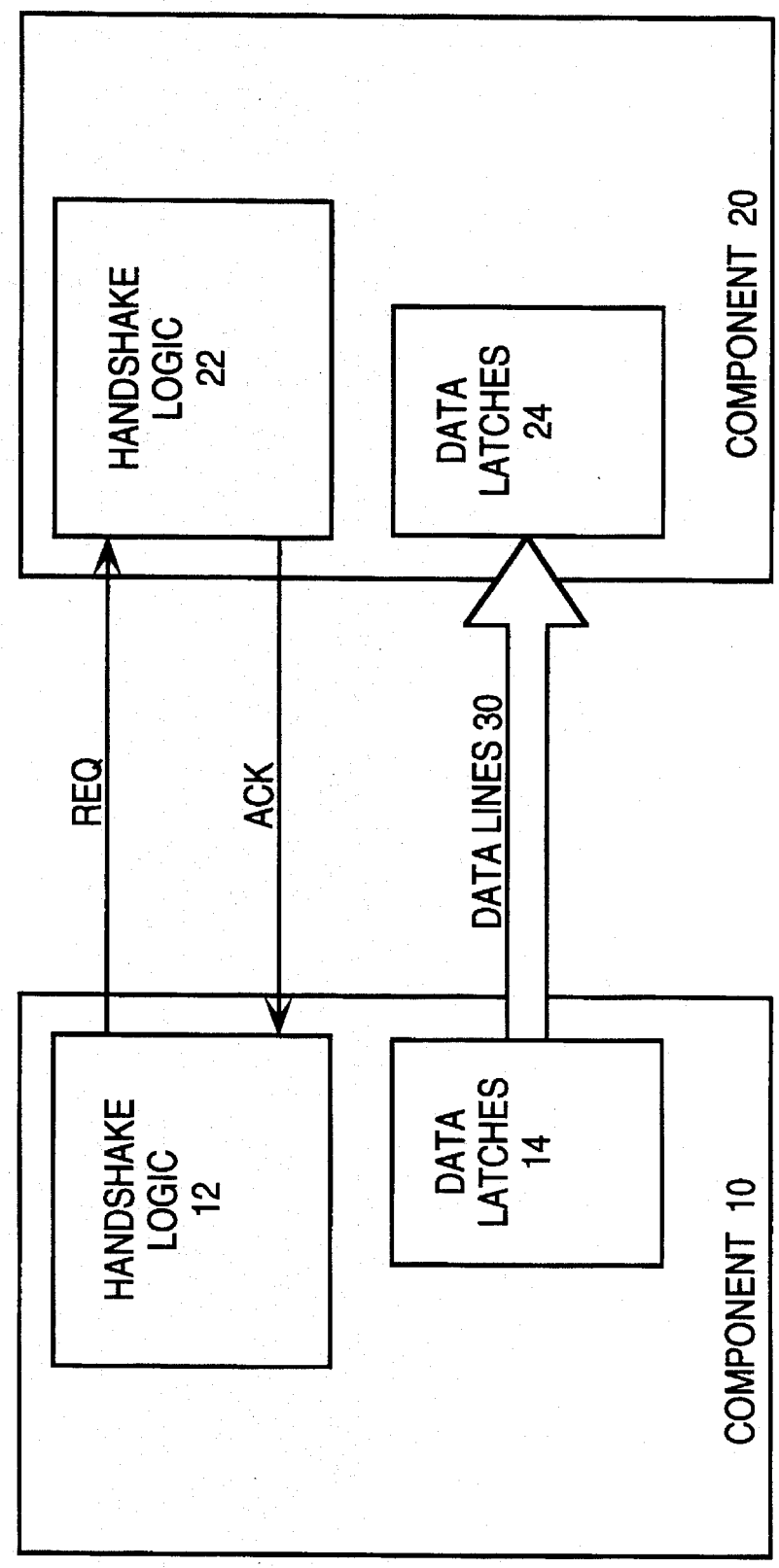
FIG. 1 illustrates two components in a computer system transferring data in accordance with another asynchronous handshake protocol.

Referring now to FIG. 1, this figure illustrates two components, component 10 and component 20, within a larger computer system. Component 10 includes handshake logic 12 and data latches 14, while in complementary fashion, component 20 includes handshake logic 22 and data latches 24. Handshake logic 12 and handshake logic 22 comprise logic circuitry which controls the issuance of, and response to, handshake control signals. Data is transferred between component 10 and component 20 over data lines 30.

In accordance with the handshake protocol of this system, when component 10 wants to send data to component 20, data is coupled from data latches 14 to data lines 30, and a request to take data signal (REQ) is coupled from handshake logic 12 to handshake logic 22 within component 20. When component 20 is able to accept the data, handshake logic 22 responds by coupling an acknowledge signal (ACK) to handshake logic 12 in component 10. This acknowledge signal (ACK) indicates to component 10 that component 20 now has the data previously coupled to data lines 30. Accordingly, if component 10 has additional data it wishes to send to component 20, it couples this additional data to data lines 30, and repeats the above process, awaiting again, an acknowledge signal (ACK) from component 20.

It will be appreciated that this method of data transfer necessarily incorporates a certain amount of time delay corresponding to the amount of time it takes for the acknowledge signal (ACK) to propagate from component 20 to component 10. This time delay becomes increasingly significant as component 10 and component 20 are placed farther and farther apart. In particular, as the components are placed farther and farther apart, the bandwidth at which data can be transferred between them diminishes. As will be described, the method and apparatus of the present invention provides for high speed data transfers which are substantially unaffected by this propagation delay. Accordingly, in accordance with the present invention, a reduction in bandwidth need not result from increased distance between the sending and the receiving component.

Figure 2:
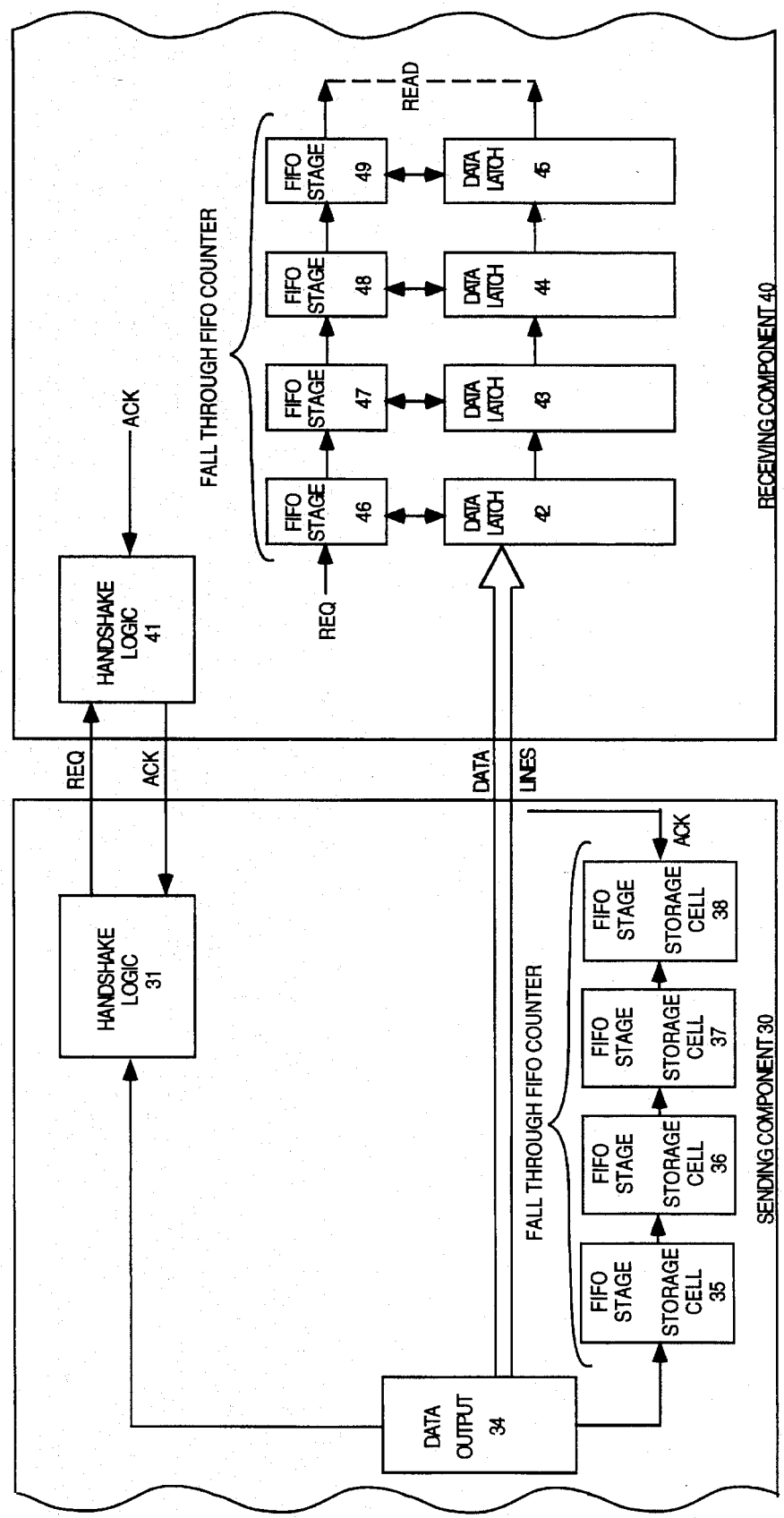
FIG. 2 illustrates, in block diagram form, a system operating in accordance with the present invention.

Referring now to FIG. 2, a simplified block diagram of a system operating in accordance with the present invention is illustrated. Two components are illustrated, a sending component 30 and a receiving component 40, both self-timed. Sending component 30 includes handshake logic 31, data output block 34, and FIFO counter stages 35, 36, 37, and 38. Handshake logic 31 comprises logic circuitry which controls the issuance of, and response to, handshake control signals. As will be described, FIFO counter stages 35, 36, 37, and 38 function together as a fall through FIFO counter such that when, for example, a logical 1 is initially coupled to FIFO counter stage 35, this logical 1 proceeds to ripple down to FIFO counter stage 38. A second logical 1 coupled to FIFO counter stage 35 would then ripple down to FIFO counter stage 37, and so on.

Continuing to refer to FIG. 2, receiving component 40 incorporates handshake logic 41, data latches 42, 43, 44, and 45, and FIFO counter stages 46, 47, 48, and 49. Handshake logic 41, like handshake logic 31, comprises logic circuitry which controls the issuance of, and response to, handshake control signals. FIFO counter stages 46, 47, 48, and 49 function together as a fall through FIFO counter in a fashion similar to the functioning of FIFO counter stages 35, 36, 37, and 38. Data latches 42, 43, 44, and 45 are coupled together in serial fashion and temporarily store data words which are coupled to receiving component 40 such that a data word coupled to receiving component 40 is initially coupled to data latch 42, and thereafter, ripples down to data latch 45. Component 40 reads data words from data latch 45. It should be noted that FIFO counter stages 35, 36, 37, and 38 correspond in number to data latches 42, 43, 44, and 45, which in turn, correspond in number to FIFO counter stages 46, 47, 48, and 49.

With reference to FIG. 2, in accordance with the data transfer method of the present invention, up to four data words can be streamed from sending component 30 to receiving component 40 before an acknowledge signal (ACK) must be returned from receiving component 40. This method of data streaming operates as follows. At start-up of the system, FIFO counter stages 35, 36, 37, 38, 46, 47, 48, and 49 are cleared to logical 0. Thereafter, whenever sending component 35 wishes to send a data word to receiving component 40, the status of FIFO counter stage 35 is checked. If FIFO counter stage 35 is in a logical 0 state, the data word is coupled from data output block 34 to data latch 42. Substantially simultaneous with the sending of this data word, data output block 34 causes handshake logic 31 to send a request to take data signal (REQ) to handshake logic 41, and further causes a logical 1 to be placed in FIFO counter stage 35. FIFO counter stages 35, 36, 37, and 38, operate together as a fall through FIFO counter. As a result, the logical 1 coupled to FIFO counter stage 35 ripples down through FIFO counter stages 36 and 37 until it reaches FIFO counter stage 38, such that FIFO counter stages 35, 36, 37, and 38 contain 0, 0, 0, 1, respectively.

Focusing now on the arrival of this data word in the receiving component 40, when this data word arrives at data latch 42 in component 40, the data is latched in data latch 42, then coupled sequentially from data latch 42, through data latches 43 and 44, until it reaches data latch 45. In a corresponding fashion, in response to the REQ signal, a logical 1 signal is coupled to FIFO counter stage 46 and rippled down through FIFO counter stages 47 and 48, until it reaches FIFO counter stage 49. Thus, in response to the transmission of this first data word, the data word is ultimately stored in data latch 45, and FIFO counter stages 46, 47, 48, and 49 contain 0, 0, 0, 1 respectively.

In the present invention, additional data words can be sent immediately, without waiting for an acknowledge signal from receiving component 40. In particular, in the system shown in FIG. 2, assuming FIFO counter stage 35 is in a logical 0 state prior to each desired data word transmission (as would be the case, for example, following start-up and the transmission of a first data word) second, third, and fourth data words can be streamed from data output block 34 to data latch 42 at a rate of transmission limited only by the physical limitations of the hardware. In the case of transmitting a second data word immediately after a first data word, the second data word is coupled from data output block 34 to data latch 42. Substantially simultaneous with the transmission of the second data word, again, a logical 1 is placed in FIFO counter stage 35 which ripples down through FIFO counter stage 36, until it reaches FIFO counter stage 37 such that the states of FIFO counter stages 35, 36, 37, and 38 are 0, 0, 1, 1, respectively. When the second data word arrives at data latch 42 in component 40, the data is coupled sequentially, or rippled down, from data latch 42, through data latch 43 until it reaches data latch 44. In corresponding fashion, a logical 1 is rippled down from FIFO counter stage 46, through FIFO counter stage 47 until it reaches FIFO counter stage 48. Thus, responsive to the second data word, data words are stored in data latches 44 and 45 and FIFO counter stages 46, 47, 48, and 49 contain 0, 0, 1, 1, respectively. The transmission of third and fourth data words follows the same process.

Asynchronous with the above described process, whenever receiving component 40 reads a data word from data FIFO 45, the receiving component 40 issues an acknowledge signal, and clears FIFO counter stage 49 to a logical 0 state. The acknowledge signal is coupled to FIFO counter stage 38, and causes FIFO counter stage 38 to be cleared to a logical 0 state. As a result, any logical 1 states in FIFO counter stages 35, 36, and 37 ripple down the FIFO counter. For example, if the states of FIFO counter stages 35, 36, 37, and 38 are 1, 1, 1, 1, respectively, and an acknowledge signal is coupled to FIFO counter stage 38, FIFO counter stage 38 is immediately cleared to a logical 0 state, and the preceding FIFO counter stages ripple all logical 1 states down until the states are 0, 1, 1, 1. The clearing of FIFO counter stage 49 results in similar results for the FIFO counter comprising FIFO counter stages 46, 47, 48, and 49.

It will be appreciated that the present invention thus provides for high speed data streaming while preventing a sending component 30 from overrunning a receiving component 40 with data. As long as FIFO counter stage 35 in component 30 is in a logical 0 state prior to the desired transmission of a data word, that data word is sent in accordance with the above process. When FIFO counter stages 35, 36, 37, and 38 are each in a logical 1 state, this effectively indicates to sending component 30 that all data FIFO's in receiving component 40 contain data words. Under these circumstances, when sending component 30 wishes to send an additional data word, it checks the status of FIFO counter stage 35, finds that it is in a logical 1 state, and does not send the data word. Sending component 30 does not send this additional data word until FIFO counter stage 35 returns to a logical 0 state. As described earlier, when FIFO counter stages 35, 36, 37, and 38 are each in a logical 1 state, FIFO counter stage 35 returns to a logical 0 state when the receiving component 40 reads a data word from data latch 45 and returns an acknowledge signal (ACK). It will, therefore, be appreciated then that FIFO counter stages 35, 36, 37, and 38 function together as a means for determining when the data latches 42, 43, 44, and 45 are full and assist sending component 30 in insuring that receiving component 40 will not be overrun with data.

As described, the process of reading data out of data latch 45 is asynchronous with the transmission of data from the sending component 30 to the receiving component 40. As a result, data can be sent from component 30 to component 40 at a first rate and consumed by component 40 at a second rate, for both the sending component 30 and the receiving component 40 are self-timed. While the preceding description has focused on a scenario wherein a data word is read from data latch 45 at a point in time when data latches 42, 43 and 44 also contain data words, it must be noted that the reading of data from data latch 45 need not occur at this particular time. For example, data can be read from data latch 45, and an acknowledge signal returned to component 30 at a point in time when only data latch 45, itself, contains a data word.

It will further be appreciated that while the present invention has been described in the context of using four data latches 42, 43, 44, and 45, and a corresponding four FIFO counter stages in each component, the present invention is in no way limited to this particular number of data latches and FIFO counter stages. In particular, virtually any depth of data latches (with corresponding FIFO counter stages) can be used in accordance with the present invention. For example, in a system where the sending and receiving components are particularly far apart, it may be desirable to substantially increase the depth of these data latches, and correspondingly increase the number of FIFO counter stages. It will be appreciated, however, that latency issues arise as additional latches are added. In particular, the latency within the receiving component, the time it takes to actually read the data, increases as the arriving data is rippled through greater and greater numbers of data latches.

Figure 3:
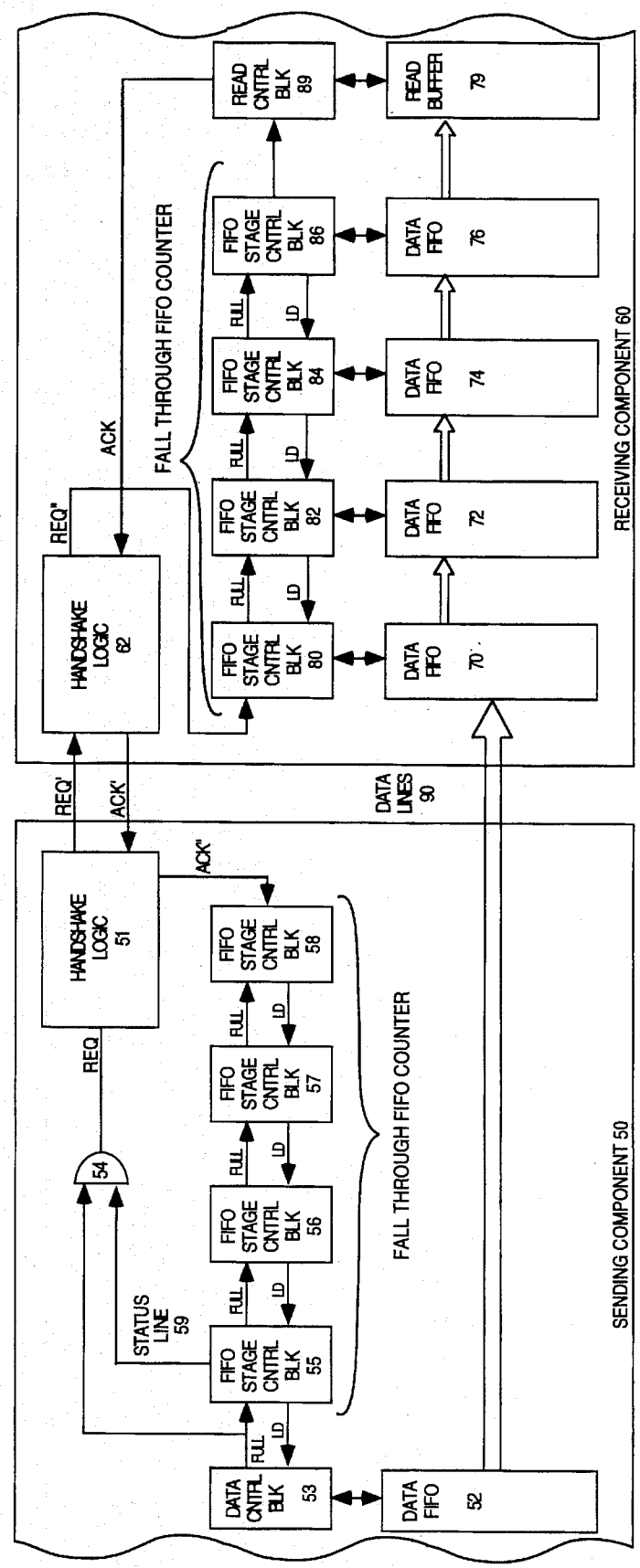
FIG. 3 illustrates, in further detail, a system operating in accordance with the present invention.

Referring now to FIG. 3, a block diagram providing further detail of a system operating in accordance with the present invention is illustrated. As shown in this figure, a sending component 50 includes handshake logic 51, data FIFO 52, data control block 53, logical AND gate 54, and FIFO control blocks 55, 56, 57, and 58. FIFO control blocks 55, 56, 57, and 58 function together as a fall through FIFO counter in a manner similar to the functioning of the FIFO counters described with respect to FIG. 2. At any given time, each of FIFO control blocks 55, 56, 57, and 58 is in one of two states: either full or empty. With respect to FIFO control block 55 in particular, the state of this FIFO control block is coupled over status line 59 to the input of logical AND gate 54. If FIFO control block is empty, a logical 1 signal is output over status line 59.

A receiving component 60 includes handshake logic 62, data FIFO's 70, 72, 74, and 76, FIFO control blocks 80, 82, 84, and 86, read control block 89 and read buffer 79. It will be noted that FIFO control blocks 80, 82, 84, and 86 correspond in number to the number of data FIFO's in receiving component 60, which in turn, correspond in number to the four FIFO control blocks 55, 56, 57, and 58 in sending component 50. Like FIFO control blocks 55, 56, 57, and 58, FIFO control blocks 80, 82, 84, and 86, function together as a fall through FIFO counter. At any given time, each of the FIFO control blocks 80, 82, 84, and 86 is in one of two states: either full or empty. Data lines 90 couple data FIFO 52 to data FIFO 70.

Continuing to refer to FIG. 3, the data transfer method of the present invention will be described with reference to this figure. At start-up, FIFO control blocks 55, 56, 57, 58, 80, 82, 84, and 86 are cleared to be in empty states. Thereafter, if sending component 50 wants to send a data word to receiving component 60, the data is initially stored in data FIFO 52, which stores, for example, a 16 bit data word. Data control block 53 couples a FULL signal (logical 1) to FIFO control block 55. If FIFO control block 55 is in an empty state (as it would be following start-up), in response to the FULL signal, it couples a LOAD signal (LD) to data control block 53. (As described earlier, if FIFO control block 55 is in an empty state, this fact is also indicated on status line 59.) In response to the LOAD signal (LD) from FIFO control block 55, data control block 53 causes data to be coupled from data FIFO 52, over data lines 90, to data FIFO 70 in receiving component 60. In addition, logical AND gate 54 receives as inputs the FULL signal (logical 1) from data control block 53, and a logical 1 signal over status line 59. As a result, logical AND gate 54 couples a request to take data signal (REQ) to handshake logic 51, which in turn, causes handshake logic 51 to couple a request to take data (REQ') signal to handshake logic 62 in receiving component 60.

Following the issuance of the LOAD signal (LD), FIFO control block 55 changes state from an empty state to a full state. As a result, of this change of state, FIFO control block 55 immediately couples a FULL signal to FIFO control block 56. If FIFO control block 56 is in an empty state, it couples a LOAD signal (LD) to FIFO control block 55, and changes from an empty state to a full state. Thus, the LOAD signal (LD) indicates to the preceding control block that the subsequent control block has accepted the full state, changed from an empty state to a full state, and that the preceding control block should clear itself to an empty state as a result. Therefore, the LOAD signal (LD) coupled from FIFO control block 56 to FIFO control block 55 serves to clear FIFO control block 55 which again returns to an empty state.

Once FIFO control block 56 is in a full state, it, in turn, immediately couples a FULL signal to FIFO control block 57. This process continues until a FIFO control block is reached which is already in a full state when a FULL signal is coupled to it. If a FIFO control block is already in a full state when a FULL signal is coupled to it, it does not return a LOAD signal (LD), and the FIFO control block coupling the FULL signal simply remains in a full state. In this way, a FULL signal is rippled down FIFO control blocks 55, 56, 57, and 58.

Returning to the initial coupling of a FULL signal from data control block 53 to FIFO control block 55, if FIFO control block 55 is already in a full state when the FULL signal is coupled, a data transfer does not take place. Instead, because FIFO control block 55 is already in a full state, it does not return a LOAD signal (LD) to data control block 53. As a result, data control block 53 does not cause data to be coupled to receiving component 60. Moreover, because FIFO control block 55 is in a full state when the FULL signal is coupled to it, the inputs to logical AND gate 54 are such that logical AND gate 54 does not initiate a request to take data signal (REQ).

Focusing now on the arrival of data words in receiving component 60, when a data word arrives, it is initially latched in data latch 70, then coupled sequentially through data latches 72 and 74, until it reaches data latch 76. In a corresponding fashion, in response to the REQ' signal, handshake logic 62 couples a REQ" signal to FIFO control block 80. FIFO control blocks 80, 82, 84, and 86 function in a fashion similar to FIFO control blocks 55, 56, 57, and 58. Accordingly, in response to the coupling of a REQ" signal, FIFO control block 80 couples a FULL signal to FIFO control block 82. If FIFO control block 82 is empty, it couples a LOAD signal (LD) to FIFO control block 80, which indicates to FIFO control block 80 that FIFO control block 82 has now loaded itself with a full state and that FIFO control block 80 should now clear itself. In this fashion, a full state is rippled down through FIFO control blocks 80, 82, 84, and 86, such that in response to the transmission of a first data word, the data word is ultimately stored in data FIFO 76, and FIFO control blocks 80, 82, 84, and 86 are in the following states contain empty, empty, empty, and full respectively.

In accordance with the present invention, additional data words can be sent immediately, without waiting for an acknowledge signal from receiving component 60. Assuming FIFO control block 55 is in an empty state prior to each desired data word transmission (as would be the case, for example, following start-up and the transmission of a first data word) second, third, and fourth data words can be streamed from data FIFO 52 to data FIFO 70 at a rate of transmission limited only by the physical limitations of the hardware.

Asynchronous with the above described process, whenever receiving component 60 reads data, it initially determines from the state of FIFO control block 86 whether a data word is present to be read. Assuming a data word is present to be read, read control block 89 causes this word to be coupled from data FIFO 76 to read buffer 79. Read control block 89 then clears FIFO control block 86 to an empty state and causes an acknowledge signal (ACK) to be coupled to handshake logic 62, which in response, couples an acknowledge signal (ACK') to handshake logic 51 in sending component 50. Handshake logic 51 causes an acknowledge signal (ACK") to be coupled to FIFO control block 58, thereby clearing FIFO control block stage 58 to an empty state. As a result, any full states in FIFO control blocks 55, 56 57, and 58 ripple down. For example, if FIFO control blocks 55, 56, 57, and 58 are each in a full state, the coupling of the acknowledge signal (ACK") from handshake logic 51 will cause these blocks to become empty, full, full and full respectively. FIFO control blocks 80, 82, 84, and 86 respond similarly to the clearing of FIFO control block 86 by read control block 89.

Figure 4:
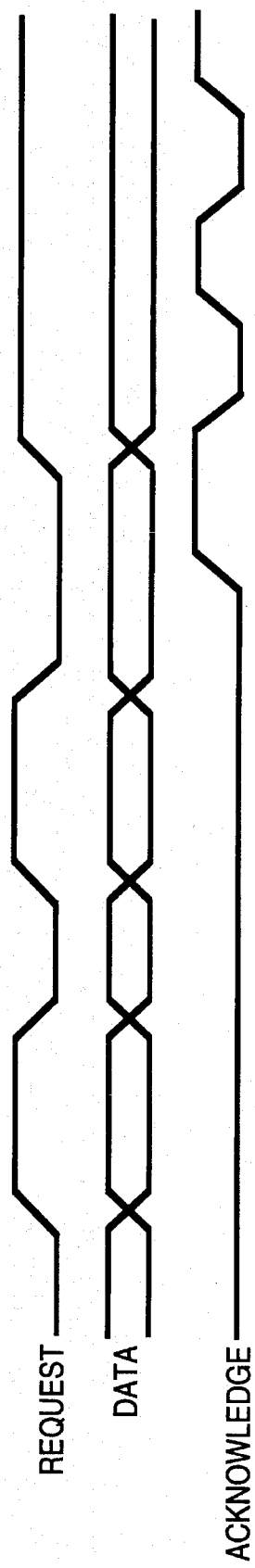
FIG. 4 illustrates a timing diagram for the transfer of five data words from a sending component to a receiving component.

Referring now to FIG. 4, this figure illustrates a timing diagram for the transfer of five data words from a sending component to a receiving component in accordance with the present invention as illustrated in FIGS. 3 and 4. It will be appreciated from this figure that in accordance with the data transfer method of the present invention, up to four data words can be streamed from a sending component to a receiving component before an acknowledge signal (ACK) must be returned from the receiving component.

While the present invention has been particularly described with reference to FIGS. 1 through 4, it should be understood that the figures are for illustration only and should not be taken as limitations upon the invention. It is further contemplated that many changes and modifications may be made to the invention, by one of ordinary skill in the art, without departing from the spirit and scope of the invention as disclosed herein.

On the first read, the logical one value in the read offset shift register 501 is shifted so that A2 555 now has the logical one value, the FULL signal is de-asserted, and the ALMOST FULL signal remains asserted. After the second read, the ALMOST FULL signal becomes de-asserted, because no two pairs of registers both have a logical one value, and again the logical one value in the read offset shift register shifts. Although not described in detail, at this point the ALMOST EMPTY signal would be asserted.

Alternative Embodiment

An alternative embodiment of the present invention generates the EMPTY, FULL, ALMOST EMPTY and ALMOST FULL control signals according to standard industry conventions. These conventions are:

1. EMPTY and ALMOST EMPTY are asserted on the rising edge of a read cycle.
2. EMPTY and ALMOST EMPTY are de-asserted on the falling edge of a write cycle.
3. FULL and ALMOST FULL are asserted on the rising edge of a write cycle.
4. FULL and ALMOST FULL are de-asserted on the falling edge of a read cycle.

This is further illustrated with reference to the timing of FIG. 7. Referring to FIG. 7, a write clock 701, read clock 702, an EMPTY signal, 703 and a FULL signal 704 are illustrated. On the falling edge of a cycle of write clock 701, the EMPTY signal 703 becomes de-asserted (see timing pointer 705). The EMPTY signal 703 is again asserted on the rising edge of a cycle of read clock 702 (see timing pointer 706). With respect to FULL signal 704, it is asserted on the rising edge of a cycle of write clock 701 (see timing pointer 707), and de-asserted on a falling edge of read clock 702 (see timing pointer 708).

In order to generate the signals according to these industry conventions, further circuitry is added. Such circuitry is illustrated in FIG. 8. One of the differences is the use of separate flag lines, here flag1 807 and flag2 809 which individually control the generation of the EMPTY and FULL signals. This allows the generation of the signals upon the proper edge of the respective read or write cycle. Coupled to flag1 807 are N-Channel transistors 820, 822 and 823. Coupled to flag2 are N-Channel transistors 821, 824 and 825. Each of the N-Channel transistors provides a means by which the flag1 807 or flag2 808 may be driven low when a pair of registers in the read and write shift registers both have a logical one value.

Each of the N-Channel transistors has as one of it's inputs, the outputs of a latch. For example, the latch 802 is coupled to N-Channel transistor 802. Each latch is clocked by the falling edges of the respective read or write clocks. These latches cause the provision of the signal upon the proper edge of the respective clock signals. For example, assume that an empty condition exists due to read that has occurred. Assume that registers 830 and 831 would both have the logical one value that creates the boundary condition. We know that the EMPTY signal is to be de-asserted on the falling edge of a write cycle. The latch 802 is clocked by the falling edge of the write cycle. Thus, on the falling edge of the write cycle, the N-Channel transistor 820 will draw flag1 807 low, thus causing the EMPTY signal to be de-asserted.

Assuming that the boundary condition is now a full condition, and that the outputs of registers 830 and 831 both have a logical one value, the case for de-asserting the FULL signal is illustrated. The full condition will be de-asserted when a read occurs. When a read cycle occurs, the logical one value will be clocked out of register 830. The N-Channel transistor 821 is coupled to receive the input of latch 801.

Latch 801 is clocked by the falling edge of the read cycle. Thus, on the falling edge of the read cycle a logical zero will be provided to N-Channel transistor 821. This will draw flag2 809 low, thus causing the FULL signal to be de-asserted.

Each of the latches and N-Channel transistor pairs operate in the manner described above.

FIG. 8 also illustrates circuitry for enabling reads and write on the falling edge of the respective read and write clocks. Here, each of RD_Cell1 811, RD_Cell 2 812, RD_Cell3 813, W_Cell1 814, W_Cell2 815 and W_Cell3 816 is coupled to an AND gate and the outputs of a corresponding latch. Each of the RD_Cell1 811, RD_Cell 2 812, RD_Cell3 813 is used to enable a read line of a memory device. Similarly, each of W_Cell1 814, W_Cell2 815 and W_Cell3 816 is used to enable a write line of a memory device.

Although not illustrated, the circuitry illustrated in FIG. 8 may also be utilized for generation of the ALMOST EMPTY and ALMOST FULL signals.

While the currently preferred embodiment is implemented to generate both control and flag signals, it would be apparent to one skilled in the art to utilize the present invention to generate flag signals (i.e. EMPTY, FULL, ALMOST EMPTY and ALMOST FULL.) Such implementations would not depart from the spirit and scope of the present invention.

Thus, a method and apparatus for generating control and flag signals for a First In First Out (FIFO) device, is described.

I claim:

1. In a computer system, a buffering device for managing the transfer of data messages between a first device in said computer system and a second device in said computer system, said buffering device comprising:

a) a memory means for storing data messages, said memory means having X locations for storing data messages;

b) a circular read shift register having X register positions, said read shift register for identifying the location in said memory means from which a next data message is to be read;

c) a circular write shift register having X register positions, said write shift register for identifying the location in said memory means into which a next data message is to be written;

d) flag signal generation means coupled to said read shift register and said write shift register, said flag signal generation means for generating a flag signal which indicates whether a boundary condition is occurring in said memory device;

e) a read toggle responsive to a read clock for indicating whether an even or odd number of boundary conditions in said memory device have occurred;

f) a write toggle responsive to a write clock for indicating whether an even or odd number of boundary conditions in said memory device have occurred;

g) full signal generation means coupled to said flag signal generation means, said read toggle and said write toggle, said full signal generation means for generating a signal that said memory means is full; and h) empty signal generation means coupled to said flag signal generation means said read toggle and said write toggle, said empty signal generation means for generating a signal that said memory means is empty.

2. The buffering device as recited in claim 1 wherein said flag signal generation means is further comprised of:

a) means for generating a logical one signal along a common line, said line being common to N-channel means.;

each of said N-Channel means coupled to corresponding outputs of said X registers of said read shift register and said X registers of said write shift register, each of said N-Channel means for converting said common line to a logical zero value if each input to said N-Channel means has a logical one value; and b) signal inversion means for inverting a signal on said common line from a logical one to a logical zero or from a logical zero to a logical one.

3. The buffering device as recited in claim 2 is further comprised of:

a) almost full signal generation means coupled to said full signal generation means and said write shift register, said almost full signal generation means for generating a signal that said memory device is almost full; and b) almost empty signal generation means coupled to said empty generation means and said read shift register, said almost empty signal generation means for generating a signal that said memory device is almost empty.

4. The buffering device as recited in claim 3 wherein said almost full signal generation means is further comprised of:

a) a read offset shift register having X registers, said read offset shift register for tracking read operations from said memory device;

b) means for generating a logical one signal along a common line;

c) N-Channel means, each of said N-Channel means coupled to corresponding outputs of said X registers of said read offset shift register and said X registers of said write shift register, each of said N-Channel means for converting said common line to a logical zero value if each input to said N-Channel means has a logical one value;

d) signal inversion means for inverting a signal on said common line from a logical one to a logical zero or from a logical zero to a logical one; and e) means for providing a logical one value if said full signal or said common line has a logical one value.

5. The buffering device as recited in claim 4 wherein said almost empty signal generation means is further comprised of:

a) a write offset shift register having X registers, said write offset shift register for tracking write operations to said memory device;

b) means for generating a logical one signal along a common line;

c) N-Channel means, each of said N-Channel means coupled to corresponding outputs of said X registers of said write offset shift register and said X registers of said write offset shift register, each of said N-Channel means for converting said common line to a logical zero value if each input to said N-Channel means has a logical one value;

d) signal inversion means for inverting a signal on said common line from a logical one to a logical zero or from a logical zero to a logical one; and e) means for providing a logical one value if said empty signal or said common line has a logical one value.

6. In a computer system, a method for generating empty and full signals for a First In First Out (FIFO) device, said method comprising the steps of:

a) setting a read shift register and a write shift register, each having a plurality of register positions, to have a single logical one value in a corresponding register position;

b) for each write operation to the FIFO, shifting said single logical one value to a next register position and toggling a write toggle value;

c) for each read operation from the FIFO, shifting said logical one value to a next register position and toggling a read toggle value;

d) after each write or read operation, identifying a boundary condition by comparing the corresponding register positions of said read shift register and said write shift register and determining if any corresponding pair of register positions both have a logical one value;

e) asserting said full signal if said boundary condition exists and said read toggle value and write toggle value have a first set of predetermined values; and f) asserting said empty signal if said boundary condition exists and said read toggle value and write toggle value have a second set of predetermined values.

7. The method as recited in claim 6 wherein the first set of predetermined values is that said read toggle has logical one value and said write toggle has a logical zero value or that read toggle value has a logical zero value and said write toggle has a logical one value.

8. The method as recited in claim 7 wherein the second set of predetermined values is that said read toggle and said write toggle both have the same logical values.

9. The method as recited in claim 6 is further comprised of the steps of:

a) setting Y register positions in a read offset shift register having a plurality of register positions to have logical one value starting from a predetermined register position from said logical one value set in said write shift register;

b) for each read operation shifting the values in read offset shift register by one register position; and c) asserting an ALMOST Full signal if said full signal is asserted or if any corresponding pair of register positions of said read offset shift register and said write shift register both have a logical one value.

10. The method as recited in claim 9 is further comprised of the steps of:

a) setting Y register positions in a write offset shift register having a plurality of positions to have logical one value starting from a predetermined register position from said logical one value set in said read shift register;

b) for each write operation shifting the values in write offset shift register by one register position; and c) asserting an ALMOST Empty signal if said empty signal is asserted or if any corresponding pair of register positions of said write offset shift register and said read shift register both have a logical one value.

11. The method as recited in claim 10 where Y=1.

12. A circuit for generating almost full and almost empty signals for a First In First Out (FIFO) controller, said FIFO controller for controlling a FIFO with X storage locations, said circuit comprising:

a) a write shift register having X register positions, said write shift register for tracking write operations of data into said memory device, said write shift register coupled to and triggered by a write clock;

b) a read shift register having X register positions, said ever a data is read out of said another last storage cell.

15. The method as set forth in claim 14, wherein each of said rippling of a set state from said another first storage cell to its immediate successor storage cell in said step (f) comprises the steps of:
   - (f.1) whenever said another first storage cell changes from a clear state to a set state, outputting a fourth control signal from said first storage cell to its immediate successor storage cell to change said immediate successor storage cell of said another first storage cell to a set state;
   - (f.2) then, conditionally changing said immediate storage cell of said another first storage cell into a set state and responding back with a fifth control signal to change said another first storage cell back into a clear state if said immediate successor storage cell of said another first storage cell is in a clear state; and
   - (f.3) finally, changing said another first storage cell back into a clear state if said fifth control signal is output by said immediate successor storage cell of said another first storage cell.

16. The method as set forth in claim 14, wherein each of said rippling of a set state into said another last storage cell in said step (f) comprises the steps of:
   - (f.1) whenever a predecessor storage cell of said another last storage cell changes from a clear state to a set state, outputting a fourth control signal from said predecessor storage cell of said another last storage cell to said another last storage cell to change said another last storage cell to a set state;
   - (f.2) then, conditionally changing said another last storage cell into a set state and responding back with a fifth control signal to change said predecessor storage cell of said another last storage cell back into a clear state if said another last storage cell is in a clear state; and
   - (f.3) finally, changing said predecessor storage cell of said another last storage cell back into a clear state if said fifth control signal is output by said another last storage cell.

17. The method as set forth in claim 14, wherein each of said coupling of said second control signal to said STIC2 in said step (a) is performed responsive to a fourth control signal provided to said first storage cell to change said storage cell into a set state from a clear state, and to the set state of said first storage cell.

18. A computer system comprising:
   - a first self-timed integrated circuit component (STIC1);
   - a second self-timed integrated circuit component (STIC2) coupled to said STIC1;
   - said STIC1 streaming data into said STIC2;
   - said STIC2 comprising a predetermined plurality of serially coupled data latches coupled to said STIC1, including a first and a last data latch whose relative positions are statically determined, for temporarily and progressively storing said data being streamed from said STIC1, said data being consecutively received into said first data latch first, then successively rippled towards said last data latch, and finally read out of said last data latch in order; and
   - said STIC1 comprising a fall through FIFO counter having a predetermined first plurality of serially coupled storage cell coupled to said STIC2, and corresponding to said data latches, including a first and a last storage cell whose relative positions are statically determined, for facilitating control of said streaming of data to said STIC2 by individually tracking said data until they are read out of said last data latch, said streaming of data being continued as long as said first storage cell can be changed into a set state from a clear state, the set states being successively rippled through said first series of storage cells towards said last storage cell, in like manner as said data are rippled through said data latches, and then changed back to clear states upon rippling to the immediate successor storage cells, and said last storage cell being changed back into a clear state responsive to a first control signal coupled from said STIC2 whenever a data is read out of said last data latch.

19. The computer system as set forth in claim 18, wherein
   - said STIC1 further comprises a first control circuitry coupled to said first storage cell for coupling a second control signal to said first storage cell to change said first storage cell into a set state;
   - said first storage cell changes itself into a set state and responds back with a third control signal if said first storage cell is in a clear state when said second control signal is output by said first control circuitry; and
   - said first control circuitry couples a data to said STIC2 if said third control signal is output by said first storage cell.

20. The computer system as set forth in claim 18, wherein said STIC2 further comprises a first control circuitry coupled to said last data latch for reading said data out of said last data latch in order.

21. The computer system as set forth in claim 20, wherein,
   - said STIC2 further comprises a predetermined second plurality of serially coupled storage cells, coupled to said STIC1, and correspondingly coupled to said data latches, including another first and another last storage cell whose relative positions are statically determined, for facilitating control of reading of said data by individually tracking said data until they are read out of said last data latch, said reading of data out of said last data latch being continued as long as said last storage cell is continually being changed into a set state from a clear state, the set states being originated consecutively from said another first storage cell, successively rippled through said second series of storage cell towards said another last storage cell, in like manner as said data are rippled through said data latches, and then changed back to clear states upon rippling to the immediate successor storage cell, and said another first storage cell being changed into a set state responsive to a second control signal coupled from said STIC1 whenever a data is streamed into said first data latch; and
   - said first control circuitry reads said data out of said last data latch in order as long as said another last storage cell of said second series of storage cells is continually being changed into a set state, said first control circuitry coupling a third control signal to said another storage cell to change said another last storage cell back into a clear state whenever said first control circuitry reads a data out of said last data latch.

22. The apparatus as set forth in claim 20, wherein said STIC1 further comprises a first control circuitry for coupling said second control signal to said STIC2 responsive to a fourth control signal provided to said first storage cell to change said into a set state from a clear state, and to the set state of said first storage cell.

* * * * *